United States Patent [19]

Bhattacharyya et al.

[11] Patent Number: 5,426,083
[45] Date of Patent: Jun. 20, 1995

[54] ABSORBENT AND PROCESS FOR REMOVING SULFUR OXIDES FROM A GASEOUS MIXTURE

[75] Inventors: Alakananda Bhattacharyya, Wheaton; Michael J. Foral, Aurora; William J. Reagan, Naperville, all of Ill.

[73] Assignee: Amoco Corporation, Chicago, Ill.

[21] Appl. No.: 252,175

[22] Filed: Jun. 1, 1994

[51] Int. Cl.$^6$ .................... B01J 20/04; B01J 20/08
[52] U.S. Cl. .................... 502/411; 502/400; 502/414; 502/415
[58] Field of Search ............. 502/63, 80, 400, 414, 502/411, 415

[56] References Cited

U.S. PATENT DOCUMENTS

| | | | |
|---|---|---|---|
| 3,835,031 | 9/1974 | Bertolacini et al. | 208/120 |
| 4,146,463 | 3/1979 | Radford et al. | 208/120 |
| 4,369,108 | 1/1983 | Bertolacini et al. | 208/120 |
| 4,472,267 | 9/1984 | Yoo et al. | 208/120 |
| 4,589,978 | 5/1986 | Green et al. | 208/113 |
| 4,626,419 | 12/1986 | Lewis et al. | 423/244 |
| 4,728,635 | 3/1988 | Bhattacharyya et al. | 502/304 |
| 4,774,212 | 9/1988 | Drezdon | 502/62 |
| 4,790,982 | 12/1988 | Yoo et al. | 423/239 |
| 4,798,819 | 1/1989 | Lewis et al. | 502/304 |
| 4,836,993 | 6/1989 | Bertolacini et al. | 423/244 |
| 4,843,168 | 6/1989 | Drezdzon et al. | 558/357 |
| 4,866,019 | 9/1989 | van Broekhoven | 502/65 |
| 4,889,615 | 12/1989 | Chin et al. | 208/113 |
| 4,946,581 | 8/1990 | van Broekhoven | 208/120 |
| 4,952,382 | 8/1990 | van Broekhoven | 423/244 |
| 5,153,156 | 10/1992 | Schutz et al. | 502/63 |
| 5,246,899 | 9/1993 | Bhattacharyya | 502/84 |
| 5,288,675 | 2/1994 | Kim | 502/65 |
| 5,354,932 | 10/1994 | Bhattacharyya | 585/400 |

OTHER PUBLICATIONS

An article entitled "Hydrotalcite-type Anionic Clays: Preparation, Properties and Applications" by F. Cavani et al. which, at pages 173–179, 201–211, and 281–285, appeared in *Catalysis Today* 11 (1991) Elsevier Science Publishers B.V. Amsterdam.

An article entitled "Catalytic SOx Abatement" by A. Bhattacharyya et al. published in Ind. Eng. Chem. Res., 1988, 27, 1356–1360.

English-language translation of an article by Miyata et al. published in Nippon Kagaku Zasshi, 92 (No. 6), 514 (1971).

*Primary Examiner*—Anthony McFarlane
*Attorney, Agent, or Firm*—Robert A. Yesukevich; Richard A. Kretchmer

[57] ABSTRACT

A collapsed composition is described which is substantially composed of microcrystallites collectively of the formula:

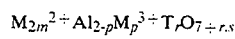

$$M_{2m}^{2+}Al_{2-p}M_{p}^{3+}T_rO_{7+r.s}$$

where $M^{2+}$ is a divalent metal, $M^{3+}$ is a trivalent metal, and T is vanadium, tungsten, or molybdenum.

The microcrystallites are so small as to be undetectable through conventional x-ray diffraction techniques, yet high resolution electron microscopy reveals that a substantial portion of the microcrystallites are composed of a solid solution having aluminum oxide molecularly dispersed in a divalent metal monoxide crystal structure. Another portion of the microcrystallites are constituted by a spinel phase. The collapsed composition is suitable as a sulfur oxide absorbent, having comparatively high capacity and comparatively fast absorption and desorption rates. The collapsed composition may be produced by heat treating a layered mixed hydroxide clay having interlayer anions in monometalate form.

A sulfur oxide separation process is also presented. The process can be operated cyclicly and integrated with any of several well-known fluidized bed catalytic cracking processes.

14 Claims, 4 Drawing Sheets

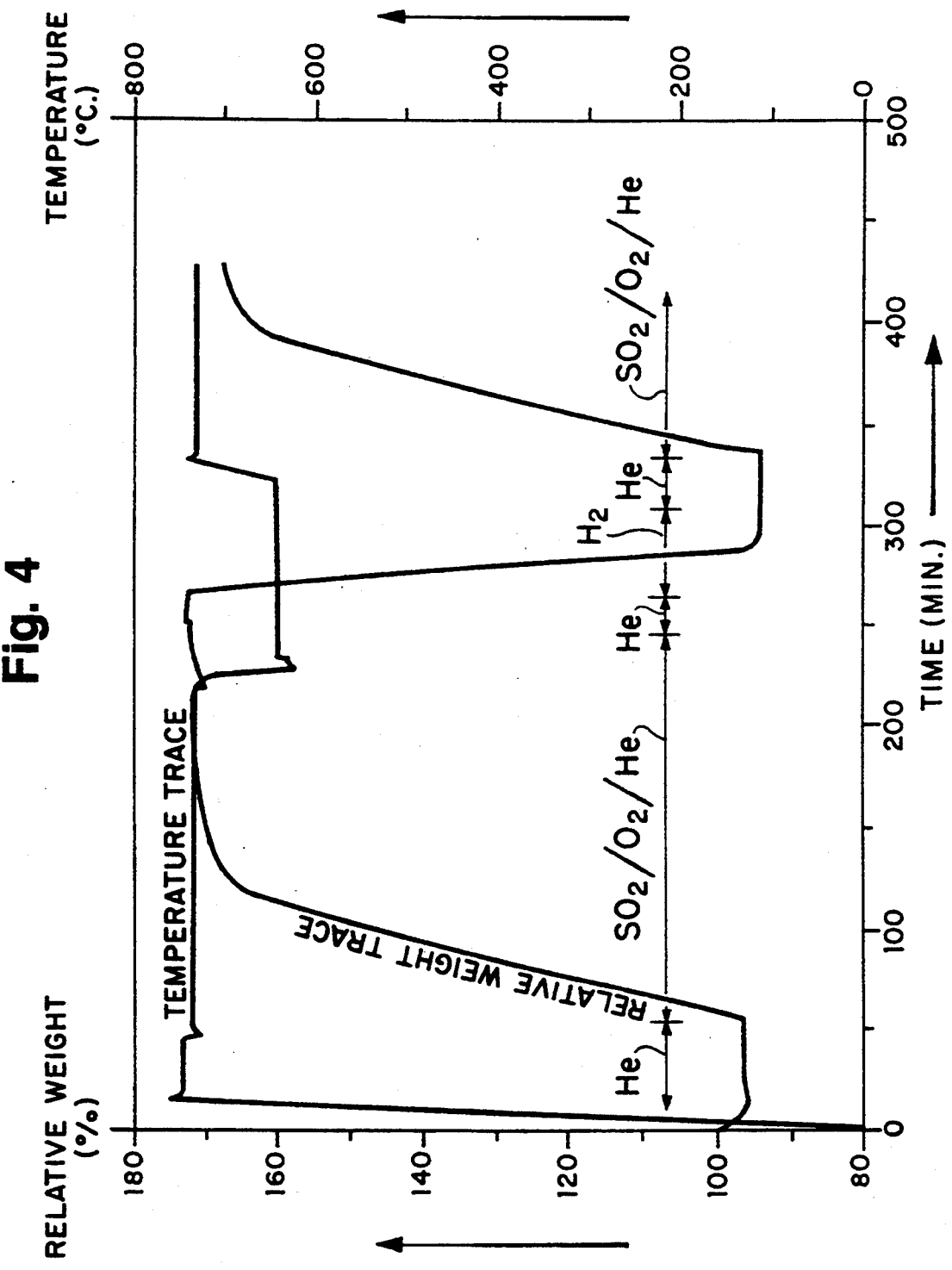

ABSORBENT AND PROCESS FOR REMOVING SULFUR OXIDES FROM A GASEOUS MIXTURE

BACKGROUND OF THE INVENTION

1. Field of the Invention

The invention relates to anionic, hydrotalcite-type pillared clay compositions and their heat-treated derivatives. The invention also relates to a process for reducing the sulfur oxide content of a gaseous mixture by absorbing sulfur oxides on an absorbent which can be reactivated for further absorption through contact with a hydrocarbon in the presence of a hydrocarbon cracking catalyst.

2. Description of the Prior Art

The development of efficient methods and catalysts for reducing the concentration of air pollutants, such as sulfur oxides, in gaseous mixtures which result from the processing and combustion of sulfur-containing fuels presents a major industrial problem which has interested researchers for a considerable time. For example, U.S. Pat. No. 3,835,031, issued to Bertolacini et al. and assigned to the assignee of the present application, describes a cyclic, fluidized catalytic cracking process operating with a catalyst comprising a molecular sieve in a silica-alumina matrix which is impregnated with one or more Group IIA metal oxides, such as magnesium oxide. By absorbing sulfur oxide within a regeneration zone and, subsequently, releasing the absorbed sulfur within a cracking reaction zone, emission of sulfur oxides in a regenerator stack gas stream is greatly reduced.

Other researchers have noted that absorbents containing rare earth metals are suitable for sulfur oxide removal service. U.S. Pat. No. 4,146,463, issued to Radford et al. and assigned to the assignee of the present invention, describes the absorption of sulfur oxides by modified catalyst particles containing the oxides of rare earth metals, such as cerium, lanthanum and neodymium. The modified catalyst particles reportedly form non-volatile sulfur compounds by reacting with sulfur oxides in a regeneration zone.

Researchers have attempted to identify an optimal structure for sulfur oxides separation catalysts. U.S. Pat. No. 4,626,419, issued to Lewis et al., is directed to a composition of matter for removing sulfur oxides from gases which comprises an alkali metal and a crystalline rare earth oxide, such as cerium oxide, having a crystal size of less than about 90 Angstrom units. The '419 Patent states that improved results measured as a reduction of sulfur in regenerator off-gas may be obtained using oxide crystals in the specified size range.

Sulfur oxide separation catalysts containing magnesium and aluminum crystalline structures in spinel form are reported, for example, in U.S. Pat. No. 4,790,982, issued to Yoo et al., which describes the use of a magnesium and aluminum spinel in conjunction with cerium metal and free magnesia. U.S. Pat. No. 4,728,635, issued to Bhattacharyya et al., is directed to a process for the production of a calcined alkaline earth, aluminum-containing spinel composition for use as a sulfur oxide and nitrogen removal agent.

U.S. Pat. No. 4,865,019, issued to Van Broekhoven, describes sulfur-oxide absorbents which comprise an anionic clay having a hydrotalcite structure. The '019 Patent states that the anionic clay can have a layered structure corresponding to a formula calling for divalent cations, trivalent cations, and anions in specified proportions. Preference is given to divalent cations $Mg^{2+}$ and trivalent cation $Al^{3+}$ alone or combined with $La^{3+}$ and/or $Ce^{3+}$. Anions $NO_3-$, $OH-$, $CI-$, $Br-$, $I-$, $CO_3^{2-}$, $SO_4^{2-}$, $SiO_3^{2-}$, $SiO_3^{2-}$, $CrO_4^{2-}$, $HPO_4^{2-}$, $MnO^{4-}$, $HGaO_3^{2-}$, $HVO_4^{2-}$, $CIO_4^{2-}$, $BO_3^{2-}$, monocarboxylates, dicarboxylates, alkyl sulfonates, and combinations thereof are listed as suitable. The '019 Patent states that the absorbents are useful after a heat treatment to a temperature in the range of about 300° to about 900° C. which reportedly can involve some decomposition of the hydrotalcite structure.

U.S. Pat. No. 4,774,212, issued to Drezdon and assigned to the assignee of the present invention, describes magnesium and aluminum hydrotalcite-type clay compositions having polyoxometalates of vanadium, tungsten, or molybdenum as pillaring anions. The compositions are reported to have an x-ray diffraction d(003) value which is larger than that of typical hydrotalcites, indicating a greater spacing between clay layers. Reference is made to use of the compositions for catalysis at temperatures in the range of about 200° to about 600° C. The '212 Patent also presents a method of preparing the described compositions which involves formulating hydrotalcite-like clays pillared by relatively large organic anions and replacing the organic anions with polyoxometalates from a solution having a pH of about 3 to about 6.

A direct and relatively simplified process for making anionic clays having a hydrotalcite structure pillared by pH-dependent inorganic anions is set forth in U.S. Pat. No. 5,246,899, issued to Bhattacharyya and assigned to the assignee of the present invention. In a preferred aspect, the process comprises adding a solution containing one or more selected divalent cations and one or more selected trivalent cations to an essentially carbonate-free solution which includes an inorganic ion and has a selectively chosen pH between about 6 and 14.

U.S. Pat. No. 5,288,675, issued to Kim, contemplates a $MgO/La_2O_3/Al_2O_3$ ternary oxide base wherein the MgO component is present as a microcrystalline phase which may be detected by x-ray diffraction. The ternary oxide base can reportedly be used in combination with ingredients such as ceria and/or vanadia to control sulfur oxide emissions. The '675 Patent states that the combination can be prepared by a multi-step process which includes reacting an aged, coprecipitated lanthanum and aluminum hydrous oxide slurry with a magnesium oxide slurry and a sodium hydroxide solution, calcining, impregnating with solutions of cerium and/or vanadium and calcining at a temperature of 450° to 700° C.

Sulfur oxide emissions from fluid catalytic cracking units, for example, are increasingly restricted by environmental regulations. The removal of sulfur oxide pollutants has been the subject of considerable attention for several years. One approach to reducing such emissions involves desulfurizing a hydrocarbon feed stream before it enters the cracking unit, so that a lesser amount of sulfur oxides are produced. Another approach is to scrub the emissions stream with an inexpensive alkaline material, such as lime or limestone. However, both of these approaches are relatively cumbersome and they create other waste disposal problems. Accordingly, separating the sulfur oxides by contact with a reusable absorbent presents an appealing alternative.

It is generally accepted that sulfur trioxide ($SO_3$) absorption proceeds more rapidly than sulfur dioxide ($SO_2$) absorption. Accordingly, efficient sulfur dioxide absorbents must perform at least three functions. First, desirable absorbents have a catalytic capability that allows them to enhance the reaction of sulfur dioxide with oxygen to form sulfur trioxide. Second, desirable absorbents are capable of binding sulfur trioxide in relatively large amounts. Third, desirable absorbents can desorb sulfur components comparatively quickly on exposure to hydrocarbons and cracking catalyst.

The sulfur oxide absorbents which have received the widest commercial acceptance to date in fluidized catalytic cracking units are based on spinel technology, most notably $MgAl_2O_4$ spinels combined with cerium oxide. Although the spinel and cerium absorbents are adequate for many purposes, they exhibit limited absorbent capacity and are prone to deactivation. In particular, free cerium oxide crystals present in the spinel and cerium absorbents tend to increase in size during normal operation so as to inhibit overall activity. Additionally, the spinel and cerium absorbents require more time for complete desorption than is available in some cyclic processing schemes.

Accordingly, a need still exists for new absorbents which can absorb and desorb comparatively larger amounts of sulfur compounds per unit mass within relatively short cycle time periods. Catalytic materials on the absorbents must be well dispersed for maximum accessibility and resist the tendency to agglomerate under operating conditions. Additionally, the absorbents should resist physical attrition and demonstrate superior stability at processing temperatures in both oxidizing and reducing environments.

SUMMARY OF THE INVENTION

The invention is an improved absorbent composition composed substantially of relatively small microcrystallites which demonstrate desirable sulfur oxide absorption capacity and comparatively fast absorption and desorption rates. High resolution electron microscopy reveals that a substantial portion of the microcrystallites are essentially composed of a solid solution having impurities, such as aluminum oxide, dispersed in a monoxide of a divalent metal. The improved absorbent also includes spinel microcrystallites and trivalent metal oxide microcrystallites. The improved absorbent can be produced by heat treating layered mixed hydroxide compositions having interlayer anions in monometalate, dimetalate, trimetalate, or tetrametalate form. The invention is also a sulfur oxide separation process which exploits the advantages of the improved absorbent.

In a preferred aspect, the invention is an anionic layered mixed hydroxide composition having the formula:

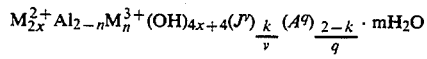

where $M^{2+}$ is a divalent metal selected from the group consisting of magnesium, calcium, zinc, barium, and strontium. $M^{3+}$ is a trivalent metal cation selected from the group consisting of cerium, lanthanum, iron, chromium, vanadium, and cobalt.

J is $VO_3$, $HVO_4$, $VO_4$, $V_2O_7$, $HV_2O_7$, $V_3O_9$, $V_4O_{12}$, $WO_4$ or $MoO_4$. A is selected from the group consisting of $CO_3$, OH, $SO_3$, $SO_4$, Cl, and $NO_3$. q and v are the net ionic charges associated with J and A, respectively. x is about 1.1 to about 3.5, while n is about 0.01 to about 0.4, m is a positive number.

In another preferred aspect, the invention is a composition suitable for use as a sulfur oxide absorbent. The absorbent comprises microcrystallites collectively of the formula:

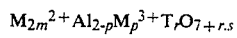

where $M^{2+}$ is a divalent metal, and $M^{3+}$ is a trivalent metal, as described above. T is vanadium, tungsten or molybdenum. p is about 0.01 to about 0.4, while r is about 0.01 to about 0.2. s is 2.5 when T is vanadium or 3 when T is tungsten or molybdenum. Each of the microcrystallite has a greatest linear dimension in the range of about 0.1 to about 30 nanometers. Moreover, a substantial portion of the microcrystallites of the invention are essentially composed of a solid solution phase having impurities, such as aluminum oxide or vanadium oxide, dispersed in a monoxide of the divalent metal. Another portion of microcrystallites are essentially composed of a spinel phase.

In yet another preferred aspect, the invention is a process for manufacturing a composition suitable for use as a sulfur oxide absorbent. In the process, water is blended with about two molar parts of a salt of a divalent metal selected from the group consisting of magnesium, calcium, zinc, strontium, and barium. Additionally, one molar part in sum of an aluminum salt and a selected trivalent metal is also blended in the mixture. The trivalent metal is selected from the group consisting of cerium, lanthanum, iron, chromium, vanadium and cobalt. A metalate salt in a quantity of about 0.1 to less than 2 molar parts is also blended into the mixture. The metalate salt contains an anionic species which is a vanadate, a tungstenate, or a molybdenate. In an especially preferred aspect, an alkalinity control agent is also blended into the mixture to stabilize the anion in an aqueous, dissociated form which contains but a single metal atom. Anions in such form are commonly described as monometalate. It is sometimes convenient to introduce the anions in solution form as a separate step after a precipitate has formed and has been calcined at least once.

The mixture is heated to a temperature in the range of about 50° to about 100° C. for at least about one hour and, thereafter, an anionic layered mixed hydroxide is recovered from the mixture. The recovered layered hydroxide is calcined for about one hour at a temperature of about 450° C. or hotter to produce a collapsed composition suitable for use as a sulfur oxide absorbent. The collapsed composition is substantially composed of microcrystallites having a greatest linear dimension in the range of 0.1 to about 30 nanometers. The collapsed composition contains microcrystallites which are essentially composed of a solid solution phase having aluminum oxide or vanadium oxide dispersed in a monoxide of the divalent metal. The collapsed composition also contains microcrystallites which are essentially composed of a spinel phase.

In an additionally preferred aspect, the invention is a process for manufacturing a composition suitable for use as a sulfur oxide absorbent which comprises calcining a layered mixed hydroxide at a temperature of at least about 450° C. for about one hour or more. The layered hydroxide is of the formula set forth above in regard to layered mixed hydroxides of the invention. The product of calcining is a collapsed composition substantially composed of microcrystallites, each of about 0.1 to about 30 nanometers in size. The microcrystallites are constituted by solid solution phase microcrystallites and by spinel phase microcrystallites, as described above.

Moreover, the invention is a process for separating sulfur oxides from gaseous mixtures. The process comprises absorbing sulfur oxides on a dehydrated and collapsed composition which is substantially composed of microcrystallites collectively of the formula set forth above with regard to collapsed compositions of the invention. The microcrystallites are of about 0.1 to about 30 nanometers. One portion of the microcrystallites is constituted by a solid solution phase and another portion of the microcrystallites is constituted by a spinel phase, as described above. The process additionally comprises desorbing sulfur dioxides from the absorbent by contacting the collapsed composition with a hydrocarbon in the presence of a cracking catalyst.

The invention is also a process for the cyclic fluidized catalytic cracking of a hydrocarbon feedstock containing organic sulfur compounds. The process comprises absorbing at least a portion of the sulfur oxides in a regeneration zone with a fluidizable particulate solid including a collapsed composition in accordance with the formula set forth above. The collapsed composition includes microcrystallites composed essentially of a solid solution phase having aluminum oxide dispersed in a monoxide of a divalent metal, as described above. The process further includes removing absorbed sulfur oxides from the particulate solid by exposing the particulate solid to the hydrocarbon feedstocks in the reaction zone.

BRIEF DESCRIPTION OF THE DRAWINGS

FIG. 4 is a dual-axis graph exhibiting a relative weight trace and a temperature trace for a second cycle and a third cycle of thermal gravimetric analysis performed on the product of Example 3.

DETAILED DESCRIPTION OF THE INVENTION

Figure 1:
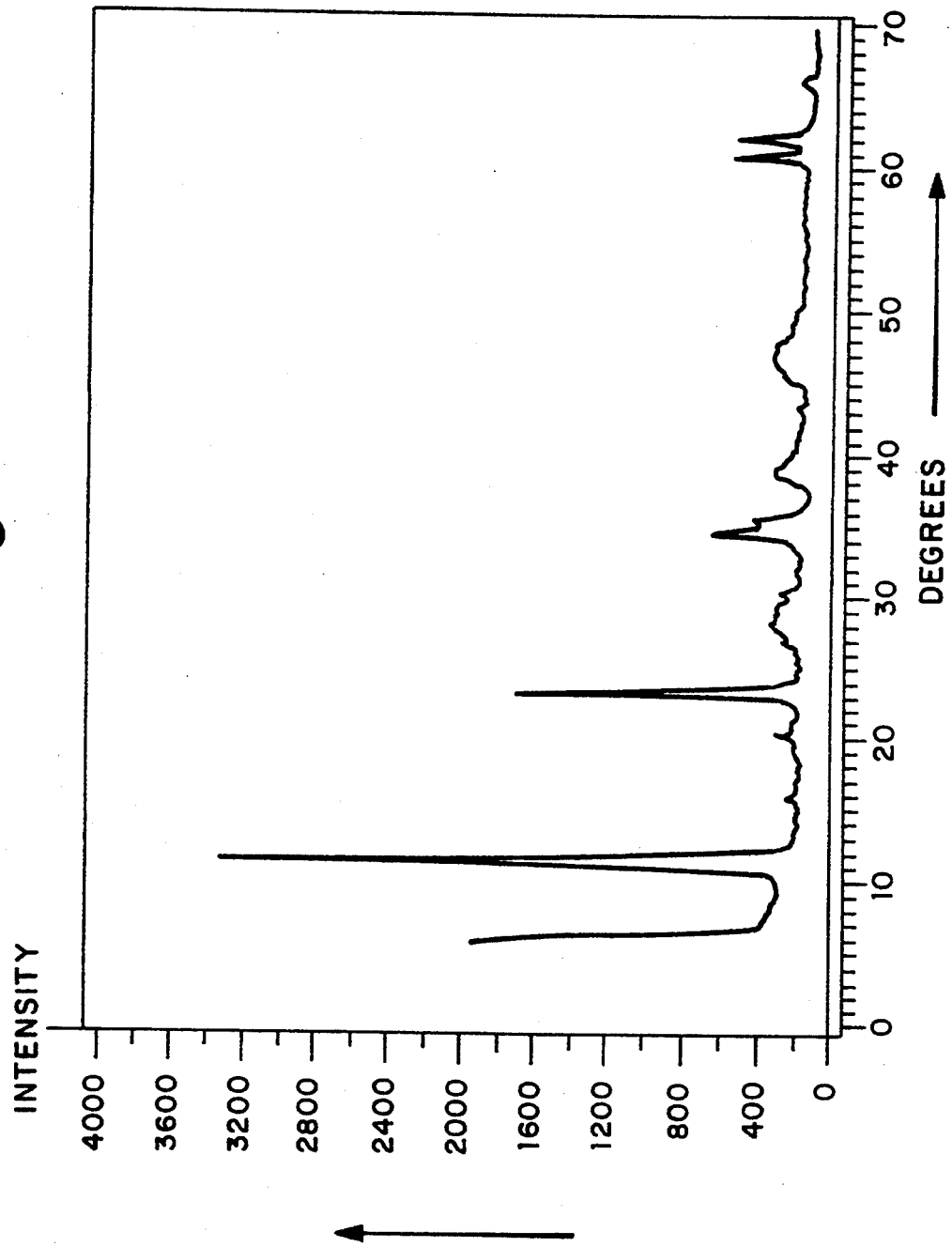
FIG. 1 is the trace of an x-ray diffraction analysis for the product of Example 1, showing a relationship between intensity and an angle (in degrees) that is characteristic of a mixed layered hydroxide structure having a d(001) value of 7.62 Angstroms units.

We have discovered that anionic layered mixed hydroxide compositions can be calcined to produce dehydrated and collapsed compositions having unique solid solution microcrystallites that are very suitable for use as sulfur oxide absorbents. The layered compositions will be described first.

Anionic layered mixed hydroxide compositions are layered in the sense that they are constituted by sheets of divalent and trivalent metal cations interposed between a larger number of hydroxide anions which are also in the sheets. They are mixed because divalent cations and trivalent cations are interspersed within the sheets. Water molecules and additional anions are located in interlayers between the sheets. When subjected to conventional x-ray diffraction analysis, the layered mixed hydroxide composition exhibits diffraction peaks whose positions can be correlated with the average distance between adjacent sheets.

In one aspect, the invention is an anionic layered mixed hydroxide composition of the formula:

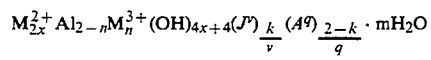

In the formula, $M^{2+}$ is a divalent metal present as a cation having a valence of positive two which is coordinated with a plurality of hydroxide artions to form infinite sheets. The structure of the sheets resembles the structure of the naturally occurring mineral brucite, $Mg(OH)_2$. The divalent metal is preferably selected from the elements of Group IIA or IIB of the periodic table of the elements as depicted on the inside front cover of *Perry's Chemical Engineers Handbook* (6th Edition). More preferably, the divalent metal is selected from the group consisting of magnesium, calcium, zinc, strontium, and barium; most preferably from the group consisting of magnesium, calcium, and zinc.

The symbol $M^{3+}$ denotes a trivalent metal present as a cation of valence three. The trivalent metal is preferably selected from the group consisting of rare earth elements, iron, chromium, vanadium, and cobalt. More preferably, the trivalent metal is selected from the group consisting of cerium, lanthanum, iron, chromium, vanadium, and cobalt; most preferably cerium and lanthanum. The rare earth elements, also known as the lanthanide series elements, are often found as a naturally occurring mixture of two or more of the rare earth elements. It is contemplated that such mixtures of rare earth elements may be conveniently employed in the present invention.

x is about 1.1 to about 3.5; preferably about 1.5 to about 3.5; and more preferably about 2 to about 3. n is about 0.01 to about 0.4, more preferably about 0.2 to about 0.4. Al is the trivalent metal aluminum present as a trivalent cation coordinated with a plurality of hydroxide anions. Additionally, it is preferred that the molar ratio of the divalent metal to aluminum be about 1 to about 5, more preferably about 2 to about 3.

J is an anion selected from the group consisting of vanadates, tungstenates and molybdenates. Preferably, J is $VO_3$, $HVO_4$, $VO_4$, $V_2O_7$, $HV_2O_7$, $V_3O_9$, $V_4O_{12}$, $WO_4$ or $MoO_4$. More preferably, J is selected from the group consisting of monovanadates, specifically metavanadate ($VO_3$), orthovanadate, ($VO_4$) and protonated vanadate ($HVO_4$). Preferably, J is located primarily in interlayers between the sheets. v is the net anionic charge associated with J. For example, the net ionic charge associated with $VO_3{}^{1-}$ is $-1$. Similarly, the net ionic charge associated with $HVO_4{}^{2-}$ is $-2$.

A is a relatively small anion having a size approximately equal to or less than that of carbonate ($CO_3$). Preferably, A is selected from a group consisting of $CO_3$, $OH$, $SO_3$, $SO_4$, $Cl$, and $NO_3$. q is the net ionic charge associated with A. k is about 0.01 to less than 2.

m is a positive number quantitatively indicating the presence of water molecules. Preferably, substantially all of the water molecules are located in the interlayer.

However, the formula presented is empirical and is not limited to any particular structure.

By way of comparison, the naturally occurring mineral hydrotalcite is a specific example of an anionic layered mixed hydroxide composition. However, the formula of hydrotalcite differs from the formula of the layered composition of the present invention in that the mineral hydrotalcite ordinarily contains substantially no divalent metals other than magnesium, substantially no trivalent metals other than aluminum, and substantially no anions other than carbonate.

The layered composition of the present invention exhibits an x-ray diffraction pattern when analyzed using conventional techniques, preferably an x-ray diffraction pattern including a d(001) value equal to or greater than about 7.6 Angstrom units. An especially preferred layered composition employs magnesium as the divalent metal, cerium as the trivalent metal, and a monovanadate as the anion J.

In another aspect, the invention is a dehydrated and at least partially collapsed composition suitable for use as a sulfur oxide removal catalyst. Preferably, the collapsed composition is prepared by heat treating the layered composition described above. Regardless of its source or method of preparation, the collapsed composition comprises microcrystallites which are collectively of the formula:

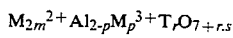

$$M^{2+}_{2m}Al_{2-p}M^{3+}_{p}T_rO_{7+r \cdot s}$$

In the formula, $M^{2+}$ is a divalent metal, Al is aluminum and $M^{3+}$ is a trivalent metal, as described above. T is vanadium, tungsten or molybdenum, preferably vanadium.

m is preferably about 1.1 to about 3.5, more preferably about 1.5 to about 3.5, and most preferably about 2 to about 3. p is about 0.01 to about 0.4, preferably about 0.2 to about 0.4. It is preferred that the molar ratio of the divalent metal to aluminum be about 1 to about 5, more preferably about 2 to about 3.

r is about 0.01 to about 0.2, preferably about 0.05 to about 0.2. In the algebraic expression communicating the subscript for O in the above formula, r is multiplied times s. s is 2.5 when T is vanadium, but s is 3 when T is tungsten or molybdenum.

Each of the microcrystallites of the invention has certain identifying characteristics. It is not necessary that every microcrystallite present in a composition possess these characteristics, but a substantial proportion of the microcrystallites must possess the characteristics in order to achieve the advantages offered by the invention.

First, the microcrystallites of the invention have a greatest linear dimension in the range of about 0.1 to about 30 nanometers, more preferably about 1 to about 20 nanometers and most preferably about 10 nanometers. The microcrystallites need not be spherical. For microcrystallites which are spherical, the greatest linear dimensions are the diameters.

Absorbents having microcrystallites with dimensions in the specified range are sometimes termed "amorphous," possibly because conventional x-ray diffraction analysis techniques are inadequate to detect the presence of their relatively small crystal structure. However, high resolution electron microscopy routinely detects microcrystallites in this size range. For the present purposes, high resolution electron microscopy is defined as electron microscopy capable of a point-to-point resolution of at least about 2.0 Angstrom units.

Such electron microscopy is also capable of detecting lattice planes in microcrystallites. A lattice plane is a regular geometrical arrangement of objects in space, such as atoms arranged in a crystalline structure, that is relatively flat in a given vicinity. When viewed on edge by appropriate electron microscopy techniques, the lattice planes appear as lines which can be curved or straight as well as continuous or discontinuous.

Additionally, the electron microscopy techniques can pinpoint the existence and location of individual lattice planes, the relative intensity of various lattice planes, and the spacing between adjacent lattice planes. Taken together, these observations of the crystal lattice, termed "lattice parameters," can be used to distinguish between two or more phases within a high resolution electron microscopes field of view. Herein, a phase is understood to be a homogeneous, physically distinct portion of matter present in a non-homogeneous physical-chemical system.

In practice, the lattice planes exhibit identifying lattice parameters, such as spacing, relative intensity, and periodic repetitions in spacing and intensity, which can be utilized to distinguish between phases. Once the presence of distinguishable phases has been determined, it may be necessary to carry out other types of analyses in order to precisely determine compositions of the phases. For example, scanning electron microscopy is often used to confirm the phase compositions.

Secondly, a substantial portion of the microcrystallites of the present invention are essentially composed of a solid solution phase in which an impurity, such as aluminum oxide ($Al_2O_3$) or vanadium oxide, is dispersed within a crystal lattice of a monoxide of a divalent metal, such as magnesium oxide (MgO). The dispersion is not merely a physical aggregation. Rather, the impurity is present as a dopant. The impurities are located so as to expand the crystal lattice of the divalent metal monoxide but not to disrupt the crystal lattice completely.

Another portion of the microcrystallites is composed essentially of a spinel phase. For example, the spinel phase may include a magnesium spinel such as $MgAl_2O_4$. Additionally, microcrystallites composed essentially of an oxide of the trivalent metal are preferably present.

The solution solid phase having aluminum oxide dispersed in a divalent monoxide crystalline structure is considered to be highly unusual. It is much more common to find relatively separate microcrystallites of aluminum oxide and the divalent monoxide together, with each microcrystallite containing but a single oxide. Accordingly, it is hypothesized that the presence of the solid solution phase of the present invention indicates a tendency to resist further division between the two phases. It is believed that the presence of the solid solution phase correlates with improved stability and activity under hydrocarbon processing conditions.

The divalent metal oxide phase can be selected from the Group IIA and Group IIB elements. Preferably the divalent metal is selected from the group consisting of magnesium, calcium, zinc, strontium, and barium, more preferably from the group consisting of magnesium, calcium and zinc. It is especially preferred that the divalent metal oxide phase be composed essentially of magnesium oxide.

The spinel phase is constituted by elements in crystalline spinel form, although the spinel may be present as microcrystallites too small to be detected by conventional x-ray diffraction analyses. The spinel structure is based on a cubic close packed array of oxide ions. Typically, the crystalline unit cell of the spinel structure contains 32 oxygen atoms. With regard to magnesium aluminum oxide spinel, there are 8 magnesium atoms and 16 aluminum atoms in each unit cell, corresponding to the formula $MgAl_2O_4$.

If oxide crystals of the trivalent metal described above are present, such as crystals of cerium oxide or lanthanum oxide, the trivalent metal oxide crystals each must be substantially in the form of microcrystallites having a greatest linear dimension in the range of about 0.1 to about 30 nanometers, preferably about 1 to about 20 nanometers. It is especially preferred that the trivalent metal be predominantly situated in relatively homogeneous microcrystallites of the present invention coexisting with solid solution microcrystallites and spinel microcrystallites.

It is hypothesized that the presence of the trivalent metal oxide phase with the other microcrystallites of the present invention provides a desirable degree of dispersion for the trivalent metal atoms and also tends to protect trivalent metal oxides from attrition. Cerium oxide crystals standing alone, for example, have a tendency to disintegrate under the stresses of fluidized bed processing.

In another aspect, the invention is a process for manufacturing a composition suitable for use as a sulfur dioxide absorbent. A mixture is produced by blending water with about two parts by moles of a salt of a divalent metal selected from the group consisting of magnesium, calcium, zinc, strontium, and barium; preferably magnesium. Additionally, about one part by moles of the combined sum of an aluminum salt and a salt of a trivalent metal selected from the group consisting of cerium, lanthanum, iron, chromium, vanadium and cobalt is blended into the mixture. The sum is calculated by adding the molar amount of the aluminium salt to the molar amount of the trivalent metal salt and dividing the total by one-half of the molar amount of the divalent metal salt. Also blended in the mixture is about 0.01 to less than 2 molar parts of a metalate salt. The metalate salt of the present invention contains an anion which is a vanadate, a tungstenate or a molybdenate. Herein, salt is intended to mean a cation and an anion joined in an ionic bond. For convenience, we refer to solutions containing dissolved salts as salt solutions even though the ionic bonds have become dissociated.

In a preferred aspect, the process also includes blending into the mixture an appropriate amount of an alkalinity control agent to stabilize the anions in an aqueous, disassociated metalate form selected from the group consisting of monometalate, dimetalate, tri metalate, and tetrametalate anions. In an especially preferred aspect, the anions are monometalates which each contain exactly one metal atom. For example, $VO_3^{1-}$, $HVO_4^{-2}$, and $VO_4^{3-}$ represent anions which each contain exactly one metal atom. Allowance must often be made for losses of the alkalinity agent to precipitation. Stabilization of the metalate anion typically takes place in a liquid phase portion of the blended mixture.

For the present purposes, blending is understood to include methods wherein all of the described ingredients are blended simultaneously, and also to include methods wherein two or more of the ingredients are blended with each other and then blended with other ingredients. At each successive combination of ingredients, care must be taken to provide concentrations and alkalinities which tend to precipitate desired divalent metals and trivalent metals, as described above. The alkalinity of the mixture can also determine which forms of the anions are stabilized in solution and ultimately become components of the precipitates. It is often convenient to delay addition of the metallate artions until after a precipitate has formed and has been subjected to recovery and calcining.

The final choice of blending amounts and conditions is guided by the knowledge of previous practitioners in the art. For example, U.S. Pat. No. 5,246,899 and allowed U.S. patent application Ser. No. 08/093,768, which are herein incorporated in their entirety, contain useful teaching regarding pH-dependent anions and intercalating agents. Additionally, pages 181 through 182 of "The Early Transition Metals," by D. L. Kepert, Academic Press (New York) are recommended for information on stabilizing vanadate ions in solution.

In an especially preferred aspect of the process, the metalate salt contains a vanadate and is blended in an amount sufficient to produce a concentration of the vanadate in a liquid phase of the mixture which is in the range of about 0.01 to about 1 molar. Additionally, sufficient alkalinity control agent resides in the liquid phase of the mixture to produce an alkalinity in the range of about 6 to about 14 pH. The range of about 6 to about 8 pH is appropriate for $VO_3^{1-}$. The range of about 9 to 13 pH is appropriate for $HVO_4^{2-}$. The range of about 13 to about 14 is appropriate for $VO_4^{3-}$.

In this especially preferred aspect of the process, it is contemplated that about 50 percent or more of the vanadate ions dissolved in the liquid portion of the mixture are in a monometalate vanadate form, such as $HVO_4^{2-}$, $VO_4^{3-}$ or $VO_3^{1-}$. Because the metavanadate anion ($VO_3^{1-}$) and the orthovanadate anion ($VO_4^{3-}$) are stabilized at conditions which are inconsistent with the precipitation of many divalent metal hydroxides and trivalent metal hydroxides, it is often convenient to blend solutions containing these anions with the product of the recovery and the first calcination described above. Preferably, the product is calcined again after being exposed to the metalate salt solution.

The heated mixture is permitted to stand for at least about 1 hour, preferably at a temperature in the range of about 50° to about 100° C., more preferably about 75° to 100° C.. Higher temperatures may be utilized provided that commensurately higher pressures exist to maintain at least a portion of the mixture in the liquid phase. An artionic layered mixed hydroxide, as described above, is recovered as a solid from the mixture. Appropriate recovery techniques include but are not limited to filtration, evaporation, fractional crystallization and spray drying.

The recovered layered mixed hydroxide is calcined for not less than about 1 hour at a temperature of about 450° C. or hotter. Preferably the temperature is in the range of about 450° to about 1000°, more preferably about 450° to about 850° C. Herein, calcining refers to the heating of a solid in the presence of a gas, preferably a flowing gas. The gas may be air or, alternatively, a relatively inert gas, such as nitrogen, helium, or carbon dioxide. The recovered material may be calcined more than once, preferably before and after one or more exposures to a metalate salt solution as described above. The final calcining produces a dehydrated and collapsed composition suitable for use as a sulfur oxide absorbent.

The collapsed composition is dehydrated in the sense that it contains essentially no associated water molecules. Additionally, the sheets containing metal cations coordinated with hydroxide anions, as described above, are at least partially disrupted by the calcining and are in a condition conveniently termed "collapsed." Rather than having sheets of 400 nanometers or more in length as are typical of the layered mixed hydroxides, the collapsed composition is substantially composed of microcrystallites, each having a greatest linear dimension in the range of about 0.1 to about 30 nanometers. It is hypothesized that the microcrystallites are disintegrated and jumbled remnants of the layered mixed hydroxides which are believed to have at least partially collapsed when subjected to the calcining. Repeated calcination steps interspersed by contact with aqueous solutions are believed to repeatedly disrupt and reform the layered sheets so as to produce a final collapsed product having an excellent degree of microcrystallite dispersion.

In any event, the microcrystallites of the invention are relatively small and well dispersed so as to be accessible to reactants such as sulfur oxides. A substantial portion of the microcrystallites are constituted by a solid solution phase having aluminum oxide dispersed in a divalent metal monoxide. Another portion is constituted by a spinel phase. The phases contain lattice planes discernible by high resolution electron microscopy.

In yet another aspect the invention is a process for manufacturing a composition suitable for use as a sulfur oxide absorbent which comprises calcining a layered mixed hydroxide of the formula:

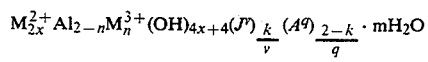

$$M^{2+}_{2x}Al_2{}_{-n}M^{3+}_n(OH)_{4x+4(J^{j-})}\underbrace{_k}_{v}(A^q)\underbrace{_{2-k}}_{q} \cdot mH_2O$$

$M^{2+}$ is a divalent metal selected from the group consisting of magnesium, calcium, zinc, barium, and strontium. Divalent metals selected from the group consisting of magnesium, calcium, and zinc are preferable because in practice they more readily form sheets of metal cations coordinated with hydroxide anions, as described above. Magnesium is especially preferred as the divalent metal.

x is about 1.1 to about 3.5, preferably 1.5 to 3.5; n is about 0.01 to about 0.4, preferably about 0.1 to about 0.3. The trivalent metal, $M^{3+}$, is selected from the group consisting of cerium, lanthanum, iron, chromium, vanadium and cobalt, preferably the trivalent metal is cerium, lanthanum or iron.

J is a monomeric anion selected from the group consisting of $VO_3$, $HVO_4$, $VO_4$, $V_2O_7$, $HV_2O_7$, $V_3O_9$, $V_4O_{12}$, $WO_4$, and $MoO_4$; v is the net ionic charge associated with J; and k is about 0.01 to less than 2.

A is $CO_3$, OH, $SO_3$, $SO_4$, Cl, or $NO_3$; q is the net ionic charge associated with A; and m is a positive number.

The calcining is performed for about one hour or more at a temperature of at least about 450° C., preferably a temperature in the range of about 450° to about 1000°, and more preferably a temperature in the range of about 450° to about 850° C. The calcining may be performed repeatedly, in two or more operations preferably interspersed by contacting with an aqueous metalate salt solution. The final calcining produces a dehydrated and collapsed composition, as described above.

In still another aspect, the invention is a process for separating sulfur oxides from a gas containing sulfur oxides which comprises absorbing sulfur oxides by exposing a gaseous mixture containing sulfur oxides to a dehydrated and collapsed composition, as described above. Herein the term "absorbing" is understood to include absorption, adsorption, imbibition, and chemisorption. The sulfur oxides include sulfur dioxide and sulfur trioxide. The absorbing causes the sulfur oxide to become associated with and remain in close proximity to the collapsed composition. It is not entirely clear whether the sulfur oxides are associated in the form of sulfur trioxide molecules, an anion containing sulfur and oxide, or some other chemical species.

The gaseous mixture from which sulfur oxides are removed need not contain molecular oxygen, but in a preferred aspect of the invention desirably contains an amount of molecular oxygen which is in excess of the stoichometric amount required to convert any sulfur dioxide present to sulfur trioxide. The excess of molecular oxygen need not be large, but the ability of the absorbent of this invention to absorb sulfur dioxide is improved as the amount of excess molecular oxygen increases. Although the reason for this effect by molecular oxygen is uncertain, it is believed that increased concentrations of oxygen promote the conversion of sulfur dioxide to sulfur trioxide and assist in rejuvenating an oxidation function of the adsorbent. It is also believed that this sulfur trioxide is more easily absorbed by the absorbent than is the sulfur dioxide. The molecular oxygen can either be inherently present in the sulfur oxide containing gaseous mixture or can be added. The absorption of sulfur oxides is desirably carried out at a temperature below about 900° C., preferably at a temperature of about 100° to about 900° C. and most preferably at a temperature of about 300° to about 800° C.

The sulfur oxides are desorbed by contacting the collapsed composition with a hydrocarbon in the presence of a cracking catalyst at an elevated temperature. The temperature is desirably about 375° to about 900° C., preferably about 430° to about 700° C., and most preferably about 450° to about 650° C. Any hydrocarbon can be used to remove the absorbed sulfur oxides from the absorbent of this invention so long as it can be cracked by the cracking catalyst at the temperatures employed. Suitable hydrocarbons include, but are not limited to methane, natural gas, natural gas liquids, naphtha, light gas oils, heavy gas oils, wide-cut gas oils, vacuum gas oils, decanted oils, and reduced crude oils as well as hydrocarbon fractions derived from shale oils, coal liquefaction and the like; such hydrocarbons can be employed either singly or in any desired combination. Additionally, the sulfur oxides can be desorbed by contact with a reducing gas such as hydrogen.

Although the invention disclosed herein is not to be so limited, it is hypothesized that a chemical reaction occurs between the collapsed composition and the sulfur oxides which results in the formation of nonvolatile inorganic sulfur compounds, such as sulfites and sulfates, at relatively high temperatures. These sulfites and sulfates can undergo partial decomposition to liberate the original sulfur oxides and collapsed composition. As a consequence of this reversal of the sulfur oxide absorption at high temperature, the absorption of sulfur oxides is desirably effected at a temperature below about 900° C. and preferably below about 800° C.

The precise mechanism by which absorbed sulfur oxides are removed from the collapsed composition is unknown, but it is believed that the combination of hydrocarbons and hydrocarbon cracking catalyst and elevated temperatures produces a reducing environment which effects a conversion of absorbed sulfur oxides to hydrogen sulfide while simultaneously reactivating the collapsed composition for further absorption of sulfur oxides. The removal of absorbed sulfur oxides from the collapsed composition is generally improved by contacting the collapsed composition with added steam either simultaneously with or subsequent to treatment with a hydrocarbon in the presence of a cracking catalyst.

The hydrogen sulfide which is produced during the removal of absorbed sulfur oxides from the collapsed composition can be converted to elemental sulfur by any of the conventional techniques which are well-known to the art as, for example, in a Claus Unit. Cracked hydrocarbon products which are produced during removal of absorbed sulfur oxides can be recycled for further use in removing absorbed sulfur oxides. It is highly preferable that the process for separating sulfur oxides further comprise exposing a layered mixed hydroxide of the formula:

$$M^{2+}_{2x}Al_{2-n}M^{3+}_{n}(OH)_{4x+4}(J^v)_{\frac{k}{v}}(A^q)_{\frac{2-k}{q}} \cdot mH_2O$$

where $M^{2+}$ is a divalent metal selected from the group consisting of magnesium, calcium, and zinc;
x is about 1.1 to about 3.5;
n is about 0.01 to about 0.4;
$M^{3+}$ is a trivalent metal selected from the group consisting of cerium, iron, chromium, vanadium and cobalt;
J is $VO_3$, $HVO_4$, $V_2O_7$, $HV_2O_7$, $V_3O_9$, $V_4O_{12}$, $VO_4$, $WO_4$ or $MoO_4$;
v is the net ionic charge associated with J;
k is about 0.01 to less than 2;
A is selected from the group consisting of $CO_3$, OH, $SO_3$, $SO_4$, Cl, $NO_3$;
q is the net ionic charge associated with A; and
m is a positive number,
to the gaseous mixture containing sulfur oxides at a temperature in the range of about 450° to about 1000° C. to produce the collapsed composition described above.

Suitable cracking catalyst for use in the practice of this invention includes all high activity solid catalysts which are stable under the required conditions. Suitable catalysts include those of the amorphous silica-alumina type, having an alumina content of about 10 to about 30 weight percent. Catalysts of the silica magnesia type are also suitable which have a magnesia content of about 20 weight percent. Preferred catalysts include those of the zeolite-type which comprise from about 0.5 to about 50 weight percent and preferably about 1 to about 30 weight percent of a crystalline alumina silicate compound distributed through a porous matrix. Zeolite-type cracking catalysts are preferred because of their thermal stability and high catalytic activity.

The crystalline alumina silicate or zeolite component of the zeolite-type cracking catalyst can be of any type or combination of types, natural or synthetic, which is known to be useful in catalyzing the cracking of hydrocarbons. Suitable zeolites include both naturally occurring and synthetic alumina silicate materials such as faujasite, chabazite, mordenite, Zeolite X, Zeolite Y, and ultra-stable large pore zeolites. The zeolite-type cracking catalyst may be dispersed within a porous refractory material, natural or synthetic, which can be, for example, silica, alumina magnesia, boria, kieselguhr, diatomaceous earth, and mullite.

In the practice of this invention, the collapsed composition can be incorporated into or deposited onto a suitable support. Suitable supports include, but are not limited to, amorphous cracking catalyst, zeolite-type cracking catalyst, silica, alumina, mixtures of silica and alumina, magnesia, mixtures of silica and magnesia, kieselguhr, kaolin, and diatomaceous earth. Preferably the support is porous and has a surface area including the area of the pores open to the surface of at least about 10, preferably at least about 50, and most preferably about 100 square meters per gram.

A highly preferred aspect of this invention comprises its use to reduce sulfur oxide emissions from catalyst regeneration in a cyclic, fluidized, catalytic cracking process. In this embodiment, a fluidizable particulate solid which comprises a dehydrated and collapsed composition is circulated through the fluidized catalytic cracking process in association with a particulate cracking catalyst. The collapsed composition is of the formula:

$$M_{2m}^{2+}Al_{2-p}M_p^{3+}+T_rO_{7+r.s}$$

The collapsed composition is substantially composed of microcrystallites of about 0.1 to about 30 nanometers. One portion of the microcrystallites are constituted by a solid solution phase having alumina oxide dispersed in a divalent metal monoxide crystal structure. Another portion of the microcrystallites is constituted by a spinel phase. Additionally, microcrystallites constituted by a trivalent metal oxide phase may be present. The phases are discernible by high resolution electron microscopy.

A feedstock is mixed with a particulate cracking catalyst in a reaction zone at a temperature in the range of about 430° C. to about 730° C. to produce cracked hydrocarbons. The contact with the cracking catalyst is preferably effected in one or more fluidized transfer line reactors at cracking temperature and at a fluidizing velocity which limits the cracking time to not more than about 10 seconds. Reaction zone effluent, comprises hydrocarbon vapors both cracked and uncracked, cracking catalyst and a carbonaceous material referred to as coke which contains sulfur, relatively volatile carbonaceous components and relatively less volatile carbonaceous components. A significant proportion of the coke adheres to the cracking catalyst.

The carbonaceous components of coke comprise highly condensed aromatic hydrocarbons which generally contain a minor amount of hydrogen, generally from about 4 to about 10 weight percent of hydrogen. When the hydrocarbon feedstock contains organic sulfur compounds, the coke also contains sulfur. As the coke builds up on the cracking catalyst, the activity of the catalyst for cracking and the selectivity of the cracking catalyst diminishes. The catalyst can, however, recover a major portion of its original capabilities by a suitable regeneration process.

Hydrocarbon vapors are separated from the cracking catalyst, and the cracking catalyst is stripped of volatile deposits before regeneration. The stripping zone can be suitably maintained at a temperature in the range of about 430° C. to about 700° C., preferably about 450° to about 650° C. and most preferably from about 765° to about 595° C. The preferred stripping gas is steam although inert gases, such as nitrogen or flue gases, or mixtures of steam with inert gases can also be used.

Stripped and partially deactivated cracking catalyst is regenerated by burning the coke deposits from the catalyst surface with a molecular oxygen containing regeneration gas, such as air, in a regeneration zone. This burning results in the formation of combustion products such as sulfur oxides, carbon monoxide, carbon dioxide and steam. The oxygen containing regeneration gas can contain relatively inert gases such as nitrogen, steam, carbon dioxide, recycled regeneration zone effluent and the like. The molecular oxygen concentration of the regeneration gas is ordinarily from 2 to about 30 volume percent and preferably from about 5 to about 25 volume percent. Since air is conveniently employed as a source of molecular oxygen, a major portion of the inert gas can be nitrogen. The regeneration zone temperatures are ordinarily in the range of about 565° to about 790°, and are preferably in the range of about 620° to about 735°.

The cracking catalyst is then returned to the reaction zone. The process also comprises removing the absorbed sulfur oxides from the particulate solid by exposing the particulate solid to the hydrocarbon feedstocks in the reaction zone. This is conveniently accomplished by recirculating the particulate solid to the reaction zone along with the regenerated cracking catalyst.

During the catalytic cracking of the hydrocarbon feedstock in the reaction zone absorbed sulfur oxides are substantially released from the particulate solid as sulfur containing gas comprising hydrogen sulfide. Similarly, subsequent steam stripping serves not only to remove the volatile coke components from the cracking catalyst, but also serves to complete the removal of any residual absorbed sulfur oxides from the particulate solid and complete the reactivation of the collapsed composition for further absorption of sulfur oxides in the regeneration zone. The resulting hydrogen sulfide is recovered together with other products from the reaction zone, and stripping zones and can be converted to elemental sulfur in facilities which are conventionally associated with a fluidized catalytic cracking unit.

The following Examples are not intended to limit the scope of the invention in any manner but, rather, are presented in order to better communicate certain aspects of the invention.

Example 1: Preparation of a Layered Mixed Hydroxide

One liter of deionized water, 15.90 grams (0.15 mol) of sodium carbonate, and 48.0 grams (1.2 mol) of sodium hydroxide were charged to a flask equipped with a mechanical stirrer and a water-cooled reflux condenser. One liter of deionized water, 102.56 grams (0.4 mol) of Mg(NO3) 2.6H2O, 67.38 grams (0.1796 mol) of Al(NO3) 3.9H2O, and 8.86 grams (0.0204) of Ce(NO3) 3.6H2O were blended and added dropwise to the flask with continuous stirring over a period of about one hour. The result was a gelatinous mixture of 10.74 pH which was heated under reflux while being swept with a nitrogen purge for about 15 hours at 85° C. The mixture was subsequently cooled, filtered, washed repeatedly with deionized water, and dried overnight under vacuum at 70°. The dried material was designated Sample A.

Sample A was analyzed by conventional x-ray diffraction techniques which produced the trace presented in FIG. 1. The trace includes peaks characteristic of a hydrotalcite structure having a d(001) value of 7.62 Angstrom units. Additionally, Sample A was analyzed for metals by inductively coupled plasma techniques and the metals were reported as 20.6 percent magnesium, 12.0 percent aluminum, 6.1 cerium, and 450 ppm sodium. The reported metals correspond to a hydrotalcite clay having the formula:

Example 2: Calcination of a Layered Mixed Hydroxide at 450°

A portion of the dried material produced by the procedure described in Example 1 above was heated in air at a rate of about 20° C. per minute until a temperature of 450° C. was achieved. The material was held at 450° for 15 hours and then cooled. The material calcined at 450° was designated Sample B.

Example 3: Calcination of a Layered Mixed Hydroxide at 850°

A portion of the dried material produced by the procedure described in Example 1 above was heated in air at a rate of about 20° C. per minute until a temperature of 850° was achieved. The material was held at 850° for 15 hours and then cooled. The material calcined at 850° was designated Sample C.

Example 4: Vanadation of 450° Calcined Material

A solution was prepared by blending 0.23 grams of NH4VO3 with 6.22 grams of deionized water. The proportions of the solution had been carefully chosen to provide a pH in the range of about 6 to about 8 in order to stabilize metavanadate ions ($VO_3^{1-}$). The solution was thoroughly mixed with 4.82 grams of Sample B which was described in Example 2 above. The resulting mixtures was dried under vacuum at 70° C. overnight and then calcined at 450° to produce a vanadated material designated Sample D. Based on the proportions of reactants, it is estimated that the theoretical formula of Sample D is approximately:

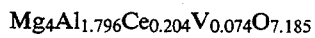

Subsequent analyses of Sample D were reported as B.E.T. surface area of 192 m²/g, average pore radius of 81 Angstrom units, micropore area of 50 m²/g, and micropore volume of 0.023 cc/g.

Example 5: Vanadation of 850° Calcined Material

The procedure of Example 4 was performed again except that Sample C described in Example 3 above was vanadated and calcined. The resulting material was designated Sample E. The estimated theoretical formula for Sample E is identical to the formula presented above for Sample D.

Subsequent analyses indicated that Sample E had a B.E.T. surface area of 119 m²/g, an average pore radius of 91 Angstrom units, a micropore area of 6 m²/g, and a micropore volume of 0.003 cc/g. High resolution electron photomicrography of Sample D, supported by scanning electron microscope analyses, indicated that a significant fraction of the microcrystallites present were composed of a solid solution phase having aluminum oxide dispersed in a magnesium oxide crystal lattice.

Example 6: Reactant Limited Vanadation

A relatively dilute vanadate solution was prepared by blending 0.11 grams of NH4VO3 with 4.0 liters of deionized water. The proportions of the solution had been chosen to provide a pH in the range which stabilizes the metavanadate form of the anion. The dilute solution was thoroughly mixed with 4.82 grams of Sample B which was described in Example 2 above. The resulting mixture was filtered, then dried under vacuum at 70° C. overnight and calcined at 450° to produce a partially vanadated material.

Based on the proportions of reactants, it is estimated that the theoretical formula of the partially vanadated material is approximately:

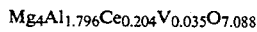

Example 7: Performance Testing of Sample D

A portion of Sample D which was described in Example 4 above was subjected to thermal gravimetric analysis during sequential periods of exposure to an oxidizing gas mixture including 5000 ppm sulfur dioxide, 2 percent oxygen and balance helium and to a reducing gas mixture including 50 percent hydrogen and balance helium. The temperature of the oxidizing gas was about 735° C., while the temperature of the reducing gas was about 640° C. Each exposure was preceded by a period of helium purge at the corresponding temperature.

Figure 2:
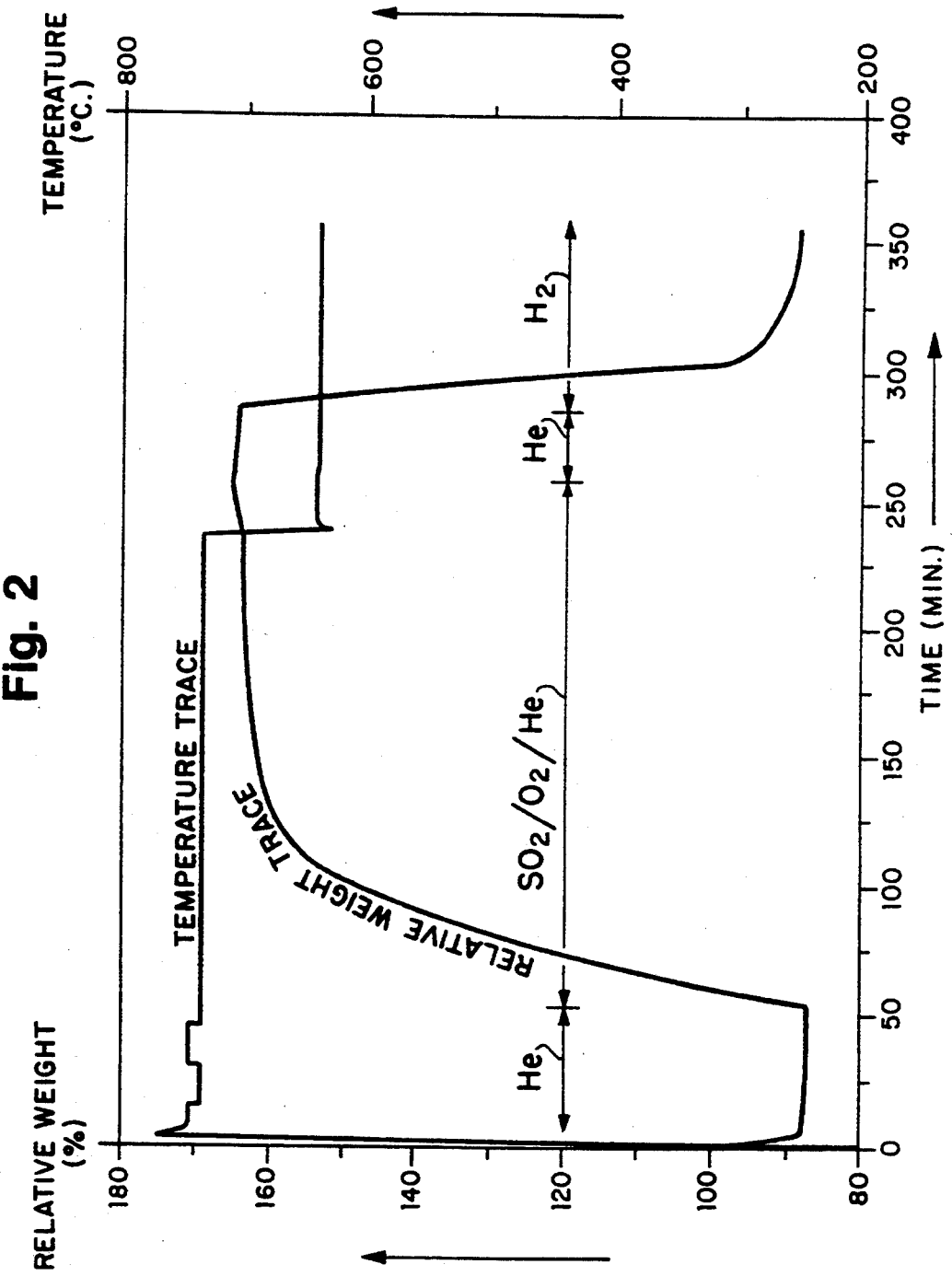
FIG. 2 is a dual-axis graph showing a relative weight for the product of Example 2 as a function of time (in minutes) during the course of a thermal gravimetric analysis having a temperature trace which is also presented in FIG. 2.

The sample, which weighed 19.7363 milligrams at the outset, exhibited a relative weight increase of 84.6 percent during ninety minutes of exposure to the oxidizing gas mixture An almost immediate relative weight decrease of 87.3 percent was observed on exposure to the reducing gas mixture. FIG. 2 depicts the relationship of relative sample weight, expressed as a percentage of the weight at the outset, to elapsed time in minutes for one oxidizing and reducing cycle of the thermal gravimetric analysis for Sample D.

Example 8: Performance Testing of Sample E

Figure 3:
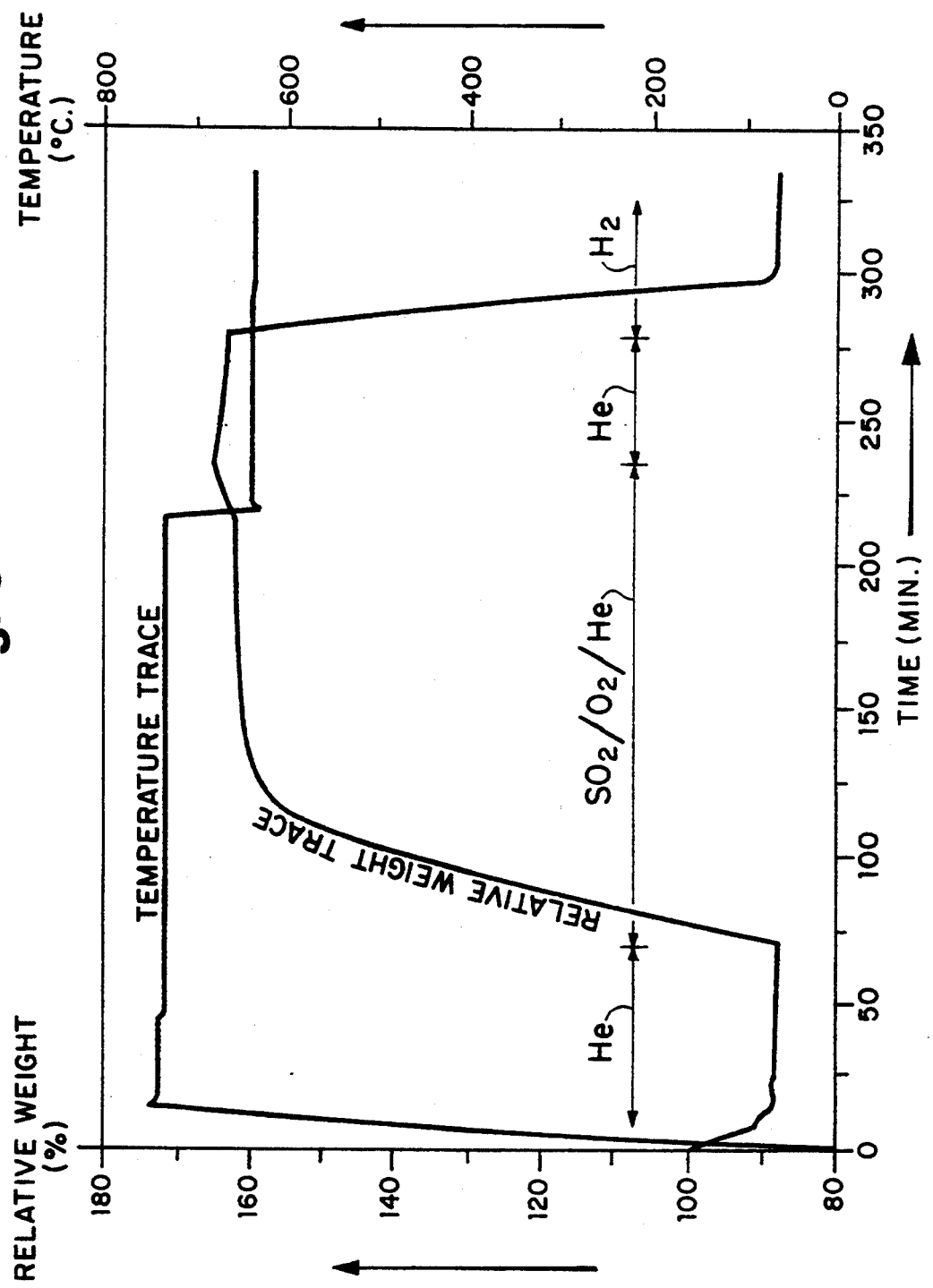
FIG. 3 is a dual-axis graph which depicts a relative weight for the product of Example 3 as a function of time during the course of a thermal gravimetric analysis having a temperature trace which is also presented in FIG. 3.

The procedure of Example 7 above was repeated with a portion of Sample E which was described in Example 5 above. The sample weighed 20.8923 milligrams at the outset. The sample increased in relative weight by 83.3 percent while exposed to the oxidizing gas mixture, and decreased in relative weight by 84.1 percent weight during the exposure to the reducing gas, based on the weight at the outset. FIG. 3 shows the relationship of relative sample weight, expressed as a percentage of the weight at the outset, to elapsed time in minutes for one oxidizing and reducing cycle of the thermal gravimetric analysis for Sample E.

Some of the Sample E material subjected to thermal gravimetric analysis was also tested for thermal gravimetric performance during a second oxidizing and reducing cycle and a third oxidizing and reducing cycle. The sample weight at the outset of the second cycle was 16.8988 milligrams, with the third cycle following immediately after the second. Relative sample weight as of a function of elapsed time as well as a temperature trace for the second and third cycles of Sample E is presented graphically in FIG. 4.

Example 9: Performance Testing of a Spinel Absorbent

A widely used sulfur oxide absorbent based on a spinel composition was commercially obtained and designated Sample F for the purpose of performing a control experiment. Sample F is not of the present invention. However, Sample F was subjected to one oxidizing and reducing cycle of the performance test described in Example 7 and Example 8 above. Sample F exhibited a 47.0 percent increase in relative weight over a period of 90 minutes exposure to the oxidizing gas containing sulfur dioxide. Exposure to the reducing gas containing hydrogen caused an almost immediate relative weight decrease of 50.3 percent.

The results of performance testing produced in Example 7, Example 8 and Example 9 are presented in Table I, below.

TABLE I

| Absorbent Sample | Cycle | Relative Weight Increase (percent) | Time mins. | Relative Weight Decrease (percent) | Time mins. |
|---|---|---|---|---|---|
| D | 1 | 84.6 | 90 | 87.3 | rapid |
| E | 1 | 83.3 | 90 | 84.1 | rapid |
|   | 2 | 76.2 | 90 | 77.4 | rapid |
|   | 3 | 78.3 | 90 | not studied | — |
| F | 1 | 47.0 | 90 | 50.3 | rapid |

Inspection of Table I reveals that the absorbents prepared according to the present invention, Sample D and Sample E, demonstrated a significantly larger capacity for sulfur dioxide absorption than did the control sample, Sample F. Additionally, Sample E of the present invention continued to absorb more sulfur dioxide on its second and third oxidizing cycles than did control Sample F on its initial oxidizing cycle. The results are especially surprising because Sample F is a commercially obtained absorbent which is representative of widely accepted and currently utilized absorbent technology.

For the purposes of the present specification, "predominantly" is defined as mostly or more often than not. In quantative terms, predominantly denotes about 50 percent or more. "Substantially" is defined as being present in significant proportions or having sufficient frequency so as to measurably affect macroscopic qualities of an associated compound or system. Where the amount required for such significant and measurable impact is not clear, substantially is synonymous with about 20 percent or more. "Essentially" is defined as absolutely but allowing for some small variations which have a negligible effect on macroscopic qualities and final outcome. Variations of about one percent can often exist without any detectable change in essential qualities.

Examples have been presented and hypotheses advanced in order to better communicate certain facets of the invention. The scope of the invention is determined solely by the appended claims, and is not limited in any way by the examples or the hypotheses. Moreover, practitioners who study the teachings set forth above will undoubtedly receive suggestions which bring to mind many additional aspects of the invention. Such obviously similar aspects, whether or not expressly described herein, are intended to be within the scope of the present claims.

We claim:

1. An anionic layered mixed hydroxide composition of the formula:

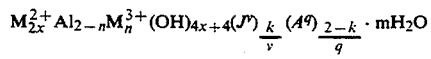

where $M^{2+}$ is a divalent metal selected from the group consisting of magnesium, calcium, zinc, barium and strontium;

x is about 1.1 to about 3.5;

n is about 0.01 to about 0.4;

$M^{3+}$ is a trivalent metal selected from the group consisting of cerium, lanthanum, iron, chromium, vanadium, and cobalt;

J is $VO_3$, $HVO_4$, $VO_4$, $V_2O_7$, $HV_2O_7$, $V_3O_9$, $V_4O_{12}$, $WO_4$ or $MoO_4$;

v is the net ionic charge associated with J;

k is about 0.01 to less than 2;

A is selected from the group consisting of $CO_3$, OH, $SO_3$, $SO_4$, Cl, and $NO_3$;

q is the net ionic charge associated with A; and m is a positive number.

2. The composition of claim 1 wherein $M^{2+}$ is magnesium; $M^{3+}$ is cerium; and J is $VO_3$, $HVO_4$, $V_2O_7$, $HV_2O_7$ or $VO_4$.

3. The composition of claim 1 having an x-ray diffraction d(001) value equal to or greater than about 7.6 Angstrom units.

4. A composition which comprises:

microcrystallites collectively of the formula:

$$M^{2+}_{2m}Al_{2-p}M^{3+}_p T_r O_{7+r.s}$$

where m is about 1.1 to about 3.5;

p is about 0.01 to about 0.4;

$M^{2+}$ is a divalent metal selected from the group consisting of magnesium, caldum, zinc, barium, and strontium;

$M^{3+}$ is a trivalent metal selected from the group consisting of cerium, lanthanum, iron, chromium, vanadium, and cobalt;

T is vanadium, tungsten or molybdenum;

r is about 0.01 to about 0.2;

s is 2.5 when T is vanadium or 3 when T is tungsten or molybdenum;

wherein the microcrystallites are substantially composed of solid solution microcrystallites having aluminum oxide dispersed in an oxide of the divalent metal and of spinel phase microcrystallites, each of the microcrystallites having the greatest linear dimension in the range of about 0.1 to about 30 nanometers.

5. The composition of claim 4 wherein the microcrystallites are additionally composed of trivalent metal oxide phase microcrystallites.

6. The composition of claim 4 wherein the spinel phase microcrystallites are essentially of the formula:

$MgAl_2O_4$

7. A process for manufacturing a composition which comprises:

blending water, about two molar parts of a salt of a divalent metal selected from the group consisting of magnesium, calcium, zinc, strontium and barium, and about one molar part in sum of an aluminum salt and a salt of a trivalent metal selected from the group consisting of cerium, lanthanum, iron, chromium, vanadium, and cobalt to produce a mixture;

heating the mixture to a temperature in the range of about 50° to about 100° C. for at least about one hour;

recovering from the mixture an anionic layered mixed hydroxide having anions selected from the group consisting of $CO_3$, OH, $SO_3$, $SO_4$, Cl and $NO_3$;

calcining the recovered layered mixed hydroxide for not less than about one hour at a temperature of about 450° C. or hotter, to produce a dehydrated material which is essentially devoid of the anions selected from the group consisting of $CO_3$, OH, $SO_3$, $SO_4$, Cl and $NO_3$;

mixing the dehydrated material with an aqueous solution including about 0.01 to less than two molar parts of a metalate salt containing vanadate, tungstenate, or molybdate anions to produce a slurry, the solution also including an amount of an alkalinity control agent appropriate to stabilize the vanadate, tungstenate, or molybdate anions in monometalate, dimetelate, trimetalate or tetrametalate form; and recovering solids from the slurry and calcining the solids to produce an at least partially collapsed composition suitable for use as a sulfur oxide absorbent which is substantially composed of solid solution microcrystallites having aluminum oxide dispersed in an oxide of the divalent metal and of spinel base microcrystallites, each of the microcrystallites having the greatest linear dimension in the range of about 0.1 to about 30 nanometers.

8. The process of claim 7 wherein the salt is blended in an amount sufficient to produce a concentration of the vanadate, tungstenate, or molybdate anion in the liquid portion of the slurry which is in the range of about 0.01 to about 1 molar and wherein the vanadate, tungstenate, or molybdate anion is a vanadate.

9. The process of claim 7 wherein the divalent metal is magnesium and the trivalent metal is cerium.

10. The process of claim 7 wherein the microcrystallites are additionally composed of trivalent metal oxide phase microcrystallites.

11. A process for manufacturing a composition suitable for use as a sulfur oxide absorbent which comprises:

blending water, about two molar parts of a salt of a divalent metal selected from the group consisting of magnesium, calcium, zinc, strontium and barium, about one molar part in sum of an aluminum salt and a salt of a trivalent metal selected from the group consisting of cerium, lanthanum, iron, chromium, vanadium, and cobalt, about 0.01 to less than two molar parts of a metalate salt containing vanadate, tungstenate, or molybdate anions, and an amount of an alkalinity control agent approximate to stabilize the anions in monometalate, dimetelate, trimetalate or tetrametalate form to produce a mixture;

heating the mixture to a temperature in the range of about 50° to about 100° C. for at least about one hour;

recovering from the mixture an anionic layered mixed hydroxide; and calcining the recovered layered mixed hydroxide for not less than about one hour at a temperature of about 450° C. or hotter, to produce an at least partially collapsed composition suitable for use as a sulfur oxide absorbent which is substantially composed of solid solution microcrystallites having aluminum oxide dispersed in an oxide of the divalent metal and of spinel phase microcrystallites each of the microcrystallites having the greatest linear dimension in the range of about 0.1 to about 30 nanometers.

12. A process for manufacturing a composition suitable for use as a sulfur oxide absorbent, which comprises:

calcining at a temperature of at least about 450° C. for about one hour or more a layered mixed hydroxide of the formula:

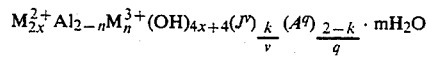

where $M^{2+}$ is a divalent metal selected from the group consisting of magnesium, calcium, zinc, barium and strontium;

x is about 1.1 to about 3.5;

$M^{3+}$ is a trivalent metal selected from the group consisting of cerium, lanthanum, iron, chromium, vanadium, and cobalt;

n is about 0.01 to about 0.4;

J is $VO_3$, $HVO_4$, $VO_4$, $V_2O_7$, $HV_2O_7$, $V_3O_9$, $V_4O_{12}$, $WO_4$, or $MoO_4$;

v is the net ionic charge associated with J;

k is about 0.01 to less than 2;

A is $CO_3$, OH, $SO_3$, $SO_4$, Cl, or $NO_3$;

q is the net ionic charge associated with A; and m is a positive number;

to produce a dehydrated and at least partially collapsed composition which is substantially composed of solid solution microcrystallites having aluminum oxide dispersed in an oxide of the divalent metal and of spinel phase microcrystallites, each of the microcrystallites having the greatest linear dimension in the range of about 0.1 to about 30 nanometers.

13. The process of claim 12 wherein the microcrystallites are additionally composed of trivalent metal oxide phase microcrystallites.

14. The process of claim 12 wherein the oxide is magnesium oxide.

* * * * *

UNITED STATES PATENT AND TRADEMARK OFFICE
CERTIFICATE OF CORRECTION

PATENT NO.: 5,426,083

DATED: June 20, 1995

INVENTOR(S): Alakananda Bhattacharyya, Michael J. Foral, William J. Reagan

It is certified that error appears in the above-identified patent and that said Letters Patent is hereby corrected as shown below:

| Col. | Line | |
|---|---|---|
| 6 | 17 | "hydroxide artions" should read --hydroxide anions-- |
| 9 | 56 | "tri metalate," should read --trimetalate,-- |
| 10 | 52 | "artionic layered mixed hydroxide," should read --anionic layered mixed hydroxide,-- |
| 16 | 12 | "$Mg_4Al_{2.099}Ce_{0.205}(OH)_{12.912}CO_3 \cdot 4H_2O$" should read --$Mg_4Al_{2.099}Ce_{0.205}(OH)_{12.912}CO_3 \cdot 4H_2O$-- |
| 19 | 26 | "caldum," should read --calcium,-- |

Signed and Sealed this

Fourteenth Day of May, 1996

BRUCE LEHMAN

Attest:

Attesting Officer        Commissioner of Patents and Trademarks